US011161512B2

(12) United States Patent
Takeda et al.

(10) Patent No.: US 11,161,512 B2
(45) Date of Patent: Nov. 2, 2021

(54) VEHICLE CONTROL SYSTEM, VEHICLE CONTROL METHOD, AND VEHICLE CONTROL PROGRAM

(71) Applicant: HONDA MOTOR CO., LTD., Tokyo (JP)

(72) Inventors: Masanori Takeda, Wako (JP); Katsuya Yashiro, Wako (JP); Toshiyuki Kaji, Wako (JP); Toru Kokaki, Wako (JP); Hiroshi Oguro, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 231 days.

(21) Appl. No.: 16/471,611

(22) PCT Filed: Dec. 28, 2016

(86) PCT No.: PCT/JP2016/089091
§ 371 (c)(1),
(2) Date: Jun. 20, 2019

(87) PCT Pub. No.: WO2018/123014
PCT Pub. Date: Jul. 5, 2018

(65) Prior Publication Data
US 2019/0382023 A1 Dec. 19, 2019

(51) Int. Cl.
*B60W 30/18* (2012.01)
*B60W 30/095* (2012.01)
(Continued)

(52) U.S. Cl.
CPC ...... *B60W 30/18163* (2013.01); *B60W 30/09* (2013.01); *B60W 30/0956* (2013.01);
(Continued)

(58) Field of Classification Search
CPC .... G08G 1/166; G08G 1/167; G06K 9/00825; B60W 30/09; B60W 30/0956; B60W 30/18163; B60W 2554/80; B60W 2556/65
See application file for complete search history.

(56) References Cited

U.S. PATENT DOCUMENTS

2007/0225907 A1* 9/2007 Oonishi ........... G08G 1/096827
701/411
2010/0246889 A1* 9/2010 Nara .................. G06K 9/00798
382/104
(Continued)

FOREIGN PATENT DOCUMENTS

JP 2008-049918 3/2008
JP 2011-081784 4/2011
(Continued)

OTHER PUBLICATIONS

International Search Report and Written Opinion for International Application No. PCT/JP2016/089091 dated Apr. 4, 2017, 9 pgs.

*Primary Examiner* — Peter D Nolan
*Assistant Examiner* — Demetra R Smith-Stewart
(74) *Attorney, Agent, or Firm* — Amin, Turocy & Watson, LLP

(57) ABSTRACT

A vehicle control system includes: a partition line recognizing unit that recognizes partition lines of a road on which a subject vehicle is running; an information acquiring unit that acquires information relating to running histories of other vehicles for a section in which no partition line can be recognized by the partition line recognizing unit from an external device; and an automated driving control unit that determines a behavior of the subject vehicle and performs automated driving on the basis of the running histories acquired by the information acquiring unit in a case in which there is a section in which no partition line can be recognized by the partition line recognizing unit after passing through a gate installed on the road.

8 Claims, 12 Drawing Sheets

(51) Int. Cl.
 B60W 30/09 (2012.01)
 G06K 9/00 (2006.01)
 G08G 1/16 (2006.01)

(52) U.S. Cl.
 CPC ......... G06K 9/00825 (2013.01); G08G 1/166 (2013.01); G08G 1/167 (2013.01); B60W 2554/80 (2020.02); B60W 2556/65 (2020.02)

(56) References Cited

U.S. PATENT DOCUMENTS

| | | | | |
|---|---|---|---|---|
| 2010/0304640 | A1* | 12/2010 | Sofman | A63H 18/12 446/456 |
| 2012/0078500 | A1* | 3/2012 | Yamada | B60W 50/14 701/301 |
| 2017/0008521 | A1* | 1/2017 | Braunstein | B60W 30/14 |
| 2017/0120912 | A1* | 5/2017 | Ishioka | B60W 40/04 |
| 2017/0322040 | A1* | 11/2017 | Stephens | G08G 1/0112 |
| 2017/0322041 | A1* | 11/2017 | Stephens | G05D 1/0088 |

FOREIGN PATENT DOCUMENTS

| | | |
|---|---|---|
| JP | 2011-145756 | 7/2011 |
| JP | 2015-102893 | 6/2015 |
| JP | 2016-513805 | 5/2016 |
| WO | 2014/152554 | 9/2014 |

* cited by examiner

| TOLLGATE ID | DATE AND TIME INFORMATION | VEHICLE ID | RUNNING RESULT | ... |
|---|---|---|---|---|
| F001 | 2016/11/24 10:30:15 | V001 | R001 | ... |
| F001 | 2016/11/24 10:30:20 | V002 | R002 | ... |
| F001 | 2016/11/24 10:30:22 | V003 | R003 | ... |
| ... | ... | ... | ... | ... |
| F002 | 2016/11/24 11:50:05 | V001 | R101 | ... |
| ... | ... | ... | ... | ... |

| TOLLGATE ID | ROUTE INFORMATION BASED ON STATISTICS | MERGING POINT | ... |
|---|---|---|---|
| F001 | SR001 | C001, C002, C003, C004 | ... |
| F002 | SR002 | C005 | ... |
| F003 | SR003 | C006, C007, C008 | ... |
| ... | ... | ... | ... |

VEHICLE CONTROL SYSTEM, VEHICLE CONTROL METHOD, AND VEHICLE CONTROL PROGRAM

TECHNICAL FIELD

The present invention relates to a vehicle control system, a vehicle control method, and a storage medium.

BACKGROUND ART

In recent years, automated driving of vehicles has been researched. In relation to this, technologies for evaluating a status predicted along an candidate route from a start point to a destination and determining a lane recommended to be used along the candidate route and associated lane level handling have been disclosed (for example, see Patent Document 1).

CITATION LIST

Patent Literature

[Patent Literature 1] Japanese Unexamined Patent Publication No. 2016-513805

SUMMARY OF INVENTION

Technical Problem

However, in the technology of a conventional technique, there are cases in which a target locus is not generated in a section in which there are no partition lines immediately after a gate, and automated driving of a vehicle cannot be continued.

The present invention is in consideration of such situations, and one objective thereof is to provide a vehicle control system, a vehicle control method, and a vehicle control program capable of improving execution continuity of automated driving in a section in which there are no partition lines immediately after a gate.

Solution to Problem

An aspect of the invention is a vehicle control system including: a partition line recognizing unit that recognizes partition lines of a road on which a subject vehicle is running; an information acquiring unit that acquires information relating to running histories of other vehicles for a section in which no partition line can be recognized by the partition line recognizing unit from an external device; and an automated driving control unit that determines a behavior of the subject vehicle and performs automated driving on the basis of the running histories acquired by the information acquiring unit in a case in which there is a section in which no partition line can be recognized by the partition line recognizing unit after passing through a gate installed on the road.

An aspect of the invention is the vehicle control system further including: an external system recognizing unit that recognizes positions of other vehicles running in the vicinity of the subject vehicle; and an other-vehicle behavior predicting unit that predicts behaviors of other vehicles recognized by the external system recognizing unit on the basis of the information relating to the running histories of the other vehicles acquired by the information acquiring unit.

An aspect of the invention is the vehicle control system wherein the other-vehicle behavior predicting unit predicts behaviors of other vehicles running along virtual loci merging into a target locus of the subject vehicle on the basis of information relating to virtual merging points of the other vehicles that are recognized or estimated on the basis of the running histories of the other vehicles acquired by the information acquiring unit.

An aspect of the invention is the vehicle control system wherein the automated driving control unit performs following running for the other vehicles running along the virtual loci merging into the target locus of the subject vehicle.

An aspect of the invention is the vehicle control system wherein the automated driving control unit performs determination of approach for the other vehicles running along virtual loci merging into the target locus of the subject vehicle and executes automated driving of avoiding a collision with the other vehicles on the basis of a result of the determination of approach.

An aspect of the invention is the vehicle control system wherein the automated driving control unit performs control of maintaining a predetermined inter-vehicle distance from other vehicles running in front of the subject vehicle at a virtual merging point of the other vehicles recognized or estimated on the basis of the running histories of the other vehicles acquired by the information acquiring unit.

An aspect of the invention is the vehicle control system wherein the automated driving control unit performs control of maintaining a predetermined inter-vehicle distance from other vehicle running in front of the subject vehicle in a case in which it is estimated by the other-vehicle behavior predicting unit that other vehicle recognized by the external system recognizing unit has cut in front of the subject vehicle.

An aspect of the invention is the vehicle control system wherein the predetermined inter-vehicle distance is a distance allowing entrance of at least one vehicle.

An aspect of the invention is a vehicle control method using an in-vehicle computer, the vehicle control method including: recognizing partition lines of a road on which a subject vehicle is running; acquiring information relating to running histories of other vehicles for a section in which no partition line can be recognized from an external device; and determining a behavior of the subject vehicle and performing automated driving on the basis of the acquired running histories in a case in which there is a section in which no partition line can be recognized after passing a gate installed on the road.

An aspect of the invention non-transitory computer-readable storage medium that stores an in-vehicle control program to be executed by an in-vehicle computer to perform at least: recognizing partition lines of a road on which a subject vehicle is running; acquiring information relating to running histories of other vehicles for a section in which no partition line can be recognized from an external device; and determining a behavior of the subject vehicle and performs automated driving on the basis of the acquired running histories in a case in which there is a section in which no partition line can be recognized after passing a gate installed on the road.

Advantageous Effects of Invention

According to the inventions described above, the subject vehicle can improve the continuity of execution of automated driving in a section in which there is no partition line immediately after a gate.

According to the invention described above, the subject vehicle can execute automated driving on the basis of a result of prediction of behaviors of other vehicles running in the vicinity thereof. Accordingly, the subject vehicle can run along an appropriate route in a section in which no partition line can be recognized.

According to the invention described above, the subject vehicle can execute automated driving with an appropriate behavior at a merging point merging with loci of other vehicles.

According to the invention described above, the subject vehicle can run by forming a vehicle row in a section in which no partition line can be recognized. In this way, a flow of vehicles is generated, and accordingly, smooth running can be realized.

According to the invention described above, the subject vehicle can improve safety near an exit of a gate having a high likelihood of merging.

According to the inventions described above, the subject vehicle inhibits congestion and delay at a virtual merging point or in cutting-in of other vehicles, and smooth running can be realized.

BRIEF DESCRIPTION OF DRAWINGS

FIG. 5 is a diagram showing one example of a running history 550A.

FIG. 6 is a diagram showing one example of statistical information 550B.

DESCRIPTION OF EMBODIMENTS

Hereinafter, a vehicle control system, a vehicle control method, and a vehicle control program according to embodiments of the present invention will be described with reference to the drawings.

Entire Configuration

Figure 1:
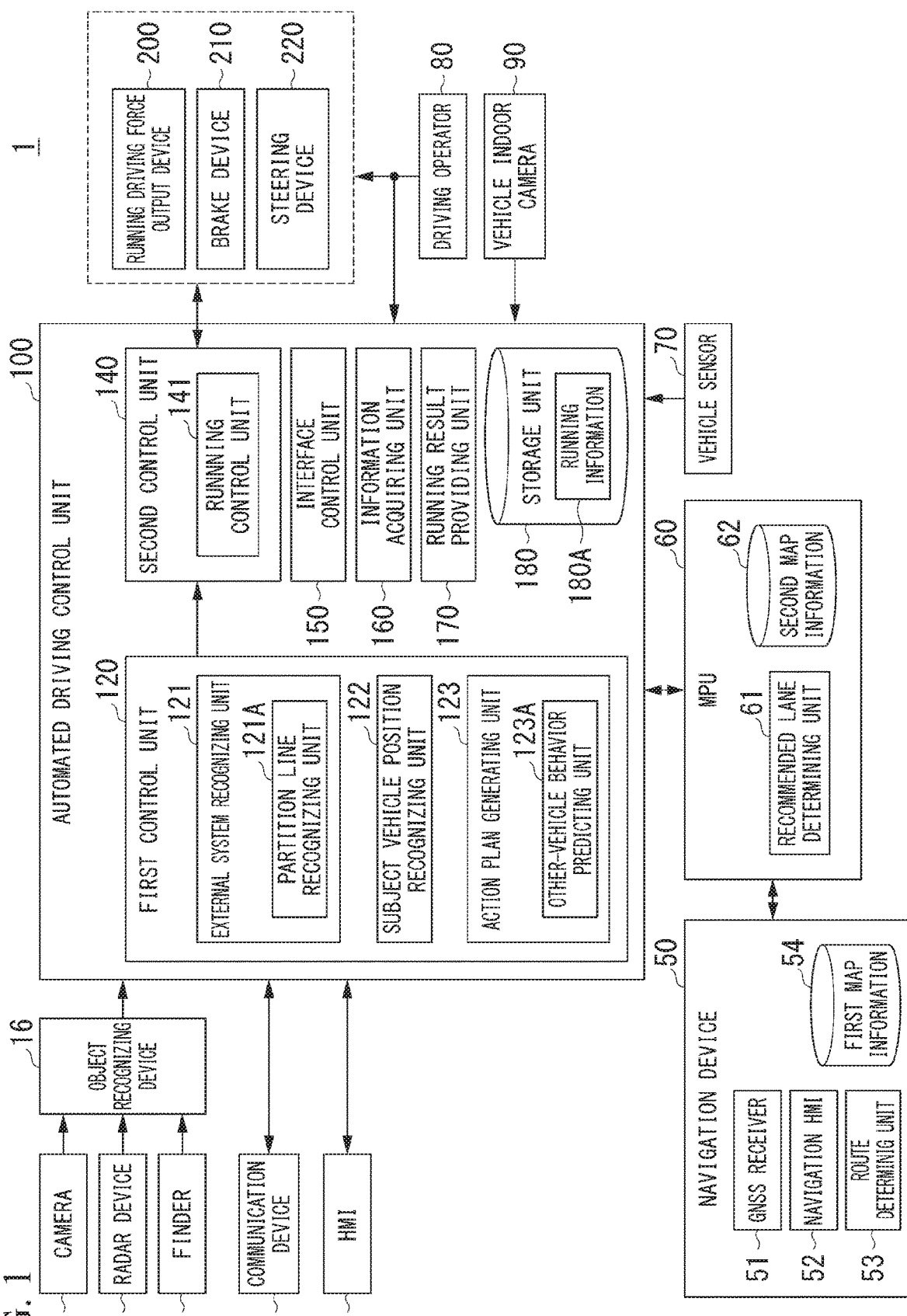
FIG. 1 is a configuration diagram of a vehicle system 1 including an automated driving control unit 100.

FIG. 1 is a configuration diagram of a vehicle system 1 including an automated driving control unit 100. A vehicle in which the vehicle system 1 is mounted (hereinafter, referred to as a "subject vehicle M") is, for example, a vehicle having two wheels, three wheels, four wheels, or the like, and a driving source thereof is an internal combustion engine such as a diesel engine or a gasoline engine, an electric motor, or a combination thereof. An electric motor operates using power generated using a power generating unit connected to an internal combustion engine or discharge power of a secondary cell or a fuel cell.

The vehicle system 1, for example, includes a camera 10, a radar device 12, a finder 14, an object recognizing device 16, a communication device 20, a human machine interface (HMI) 30, a navigation device 50, a micro-processing unit (MPU) 60, a vehicle sensor 70, a driving operator 80, a vehicle indoor camera 90, an automated driving control unit 100, a running driving force output device 200, a brake device 210, and a steering device 220. Such devices and units are interconnected using a multiplex communication line such as a controller area network (CAN) communication line, a serial communication line, a radio communication network, or the like. In addition, the configuration shown in FIG. 1 is merely one example, and thus, some components may be omitted, and, furthermore, another component may be added thereto.

The "vehicle control system", for example, includes a camera 10, a radar device 12, a finder 14, an object recognizing device 16, and an automated driving control unit 100.

The camera 10, for example, is a digital camera using a solid-state imaging device such as a charge coupled device (CCD) or a complementary metal oxide semiconductor (CMOS). One or a plurality of cameras 10 are installed at arbitrary places in a vehicle in which the vehicle system 1 is mounted. In a case in which the side in front is to be imaged, the camera 10 is installed at an upper part of a front windshield, a rear face of a rear-view mirror, or the like. In a case in which the side in rear is to be imaged, the camera 10 is installed at an upper part of a rear windshield, a backdoor, or the like. In a case in which the lateral side is to be imaged, the camera 10 is installed at a door mirror or the like. The camera 10, for example, repeatedly images the vicinity of the subject vehicle M periodically. The camera 10 may be a stereo camera.

The radar device 12 emits radiowaves such as millimeter waves to the vicinity of the subject vehicle M and detects at least a position (a distance and an azimuth) of an object by detecting radiowaves (reflected waves) reflected by the object. One or a plurality of radar devices 12 are installed at arbitrary places in the subject vehicle M. The radar device 12 may detect a position and a speed of an object using a frequency modulated continuous wave (FMCW) system.

The finder 14 is a light detection and ranging or a laser imaging detection and ranging (LIDAR) finder that detects a distance to a target by measuring light scattered from emitted light. One or a plurality of finders 14 are installed at arbitrary places in the subject vehicle M.

The object recognizing device 16 may perform a sensor fusion process on results of detection using some or all of the camera 10, the radar device 12, and the finder 14, thereby recognizing a position, a type, a speed, and the like of an object. The object recognizing device 16 outputs a result of recognition to the automated driving control unit 100.

The communication device 20, for example, communicates with other vehicles present in the vicinity of the subject vehicle M using a cellular network, a Wi-Fi network, Bluetooth (registered trademark), dedicated short range communication (DSRC), or the like or communicates with various server apparatuses through a radio base station.

The HMI 30 presents various types of information to a vehicle occupant inside the vehicle and accepts an input operation performed by a vehicle occupant. The HMI 30, for example, includes various display devices, a speaker, a buzzer, a touch panel, a switch, a key, and the like.

The navigation device 50, for example, includes a global navigation satellite system (GNSS) receiver 51, a navigation HMI 52, and a route determining unit 53 and stores first map information 54 in a storage device such as a hard disk drive (HDD) or a flash memory. The GNSS receiver identifies a position of the subject vehicle M on the basis of signals received from GNSS satellites. The position of the subject vehicle M may be identified or complemented by an inertial navigation system (INS) using an output of the vehicle sensor 70. The navigation HMI 52 includes a display device, a speaker, a touch panel, a key, and the like. A part or the whole of the navigation HMI 52 and the HMI 30 described above may be configured to be shared. The route determining unit 53, for example, determines a route from a position of the subject vehicle M identified by the GNSS receiver 51 (or an input arbitrary position) to a destination input by a vehicle occupant using the navigation HMI 52 by referring to the first map information 54. The first map information 54, for example, is information in which a road form is represented by respective links representing a road and respective nodes connected using the links. The first map information 54 may include a curvature of each road, point of interest (POI) information, and the like. The route determined by the route determining unit 53 is output to the MPU 60. In addition, the navigation device 50 may perform route guidance using the navigation HMI 52 on the basis of the route determined by the route determining unit 53. Furthermore, the navigation device 50, for example, may be realized by a function of a terminal device such as a smartphone or a tablet terminal carried by a user. In addition, the navigation device 50 may transmit a current position and a destination to a navigation server through the communication device 20 and acquire a route received from the navigation server as a reply.

The MPU 60, for example, functions as a recommended lane determining unit 61 and maintains second map information 62 in a storage device such as an HDD or a flash memory. The recommended lane determining unit 61 divides a route provided from the navigation device 50 into a plurality of blocks (for example, divides the route into blocks of 100 m in the advancement direction of the vehicle) and determines a recommended lane for each block by referring to the second map information 62. The recommended lane determining unit 61 determines which lane to run from the left side. In a case in which a branching place, a merging place, or the like is present in the route, the recommended lane determining unit 61 determines a recommended lane such that the subject vehicle M can run on a reasonable running route for advancement to divergent destinations.

The second map information 62 is map information having an accuracy higher than that of the first map information 54. The second map information 62, for example, includes information of partition lines that partition a road. The partition lines, for example, may include intermittent partition lines such as Botts' Dots and cat's eyes in addition to linear partition lines such as a white line and a yellow line. In addition, the second map information 62, for example, includes information of the center of respective lanes, information on boundaries between lanes, or the like. In addition, in the second map information 62, road information, traffic regulations information, position information and identification information of various gates such as tollgates and the like in an expressway and a toll road, address information (address and zip code), facilities information, telephone information, and the like may be included. In the road information, information representing a type of road such as an expressway, a toll road, a national highway, or a prefectural road and information such as the number of lanes of a road, an emergency parking area, a width of each lane, a gradient of a road, a position of a road (three-dimensional coordinates including longitude, latitude, and a height), a curvature of the curve of a lane, positions of merging and branching points of lanes, a sign installed on a road, and the like are included. The second map information 62 may be updated as is necessary by accessing another device using the communication device 20.

The vehicle sensor 70 includes a vehicle speed sensor detecting a speed of the subject vehicle M, an acceleration sensor detecting an acceleration, a yaw rate sensor detecting an angular velocity around a vertical axis, an azimuth sensor detecting the azimuth of the subject vehicle M, and the like.

The driving operator 80, for example, includes an acceleration pedal, a brake pedal, a shift lever, a steering wheel, and other operators. A sensor detecting the amount of an operation or the presence/absence of an operation is installed in the driving operator 80, and a result of detection acquired by the sensor described above is output to one or both of the automated driving control unit 100 and the running driving force output device 200, the brake device 210, or the steering device 220.

The vehicle indoor camera 90 images an upper body half by focusing on the face of a vehicle occupant sitting on a seat (for example, a driver seat) of the subject vehicle M. An image captured by the vehicle indoor camera 90 is output to the automated driving control unit 100.

Automated Driving Control Unit

The automated driving control unit 100, for example, includes a first control unit 120, a second control unit 140, an interface control unit 150, an information acquiring unit 160, a running result providing unit 170, and a storage unit 180. Each of the first control unit 120, the second control unit 140, the interface control unit 150, the information acquiring unit 160, and the running result providing unit 170 is realized by a processor such as a central processing unit (CPU) executing a program (software). In addition, some or all of the functional units of the first control unit 120, the second control unit 140, the interface control unit 150, the information acquiring unit 160, and the running result providing unit 170 may be realized by hardware such as a large scale integration (LSI), an application specific integrated circuit (ASIC), a field-programmable gate array (FPGA), or the like or may be realized by cooperation between software and hardware.

In addition, a unit including some or all of an external system recognizing unit 121, a subject vehicle position recognizing unit 122, and an action plan generating unit 123 of the first control unit 120 and a running control unit 141 of the second control unit 140 to be described later is one example of an "automated driving control unit". The automated driving control unit, for example, executes automated driving of the subject vehicle M by automatically controlling at least one of acceleration/deceleration and steering of the subject vehicle M.

The first control unit 120, for example, includes the external system recognizing unit 121, the subject vehicle position recognizing unit 122, and the action plan generating unit 123.

The external system recognizing unit 121 recognizes states of other vehicles running in the vicinity of the subject vehicle M (surrounding vehicles) such as positions, speeds, and accelerations on the basis of information input from the camera 10, the radar device 12, and the finder 14 through the object recognizing device 16. The position of a surrounding vehicle may be represented as a representative point of the surrounding vehicle such as the center of gravity, a corner, or the like and may be represented by an area represented by the contour of the surrounding vehicle. The "state" of a surrounding vehicle may include an acceleration or a jerk or may be an "action state" (for example, the vehicle is changing lanes or is to change lanes) of the surrounding vehicle.

In addition, the external system recognizing unit 121 may recognize positions of guard rails, electric posts, parked vehicles, pedestrians, and other objects in addition to the surrounding vehicles.

Furthermore, the external system recognizing unit 121, for example, includes a partition line recognizing unit 121A. Details of the function of the partition line recognizing unit 121A will be described later.

The subject vehicle position recognizing unit 122, for example, recognizes a lane (running lane) in which the subject vehicle M runs and a relative position and a posture of the subject vehicle M with respect to the running lane. The subject vehicle position recognizing unit 122, for example, by comparing a pattern (for example, an array of solid lines and broken lines) of a road partition line that is acquired from the second map information 62 with a pattern of the road partition line in the vicinity of the subject vehicle M that is recognized from an image captured by the camera 10, recognizes a running lane. In the recognition, the position of the subject vehicle M acquired from the navigation device 50 and a processing result acquired using the INS may be additionally taken into account.

Figure 2:
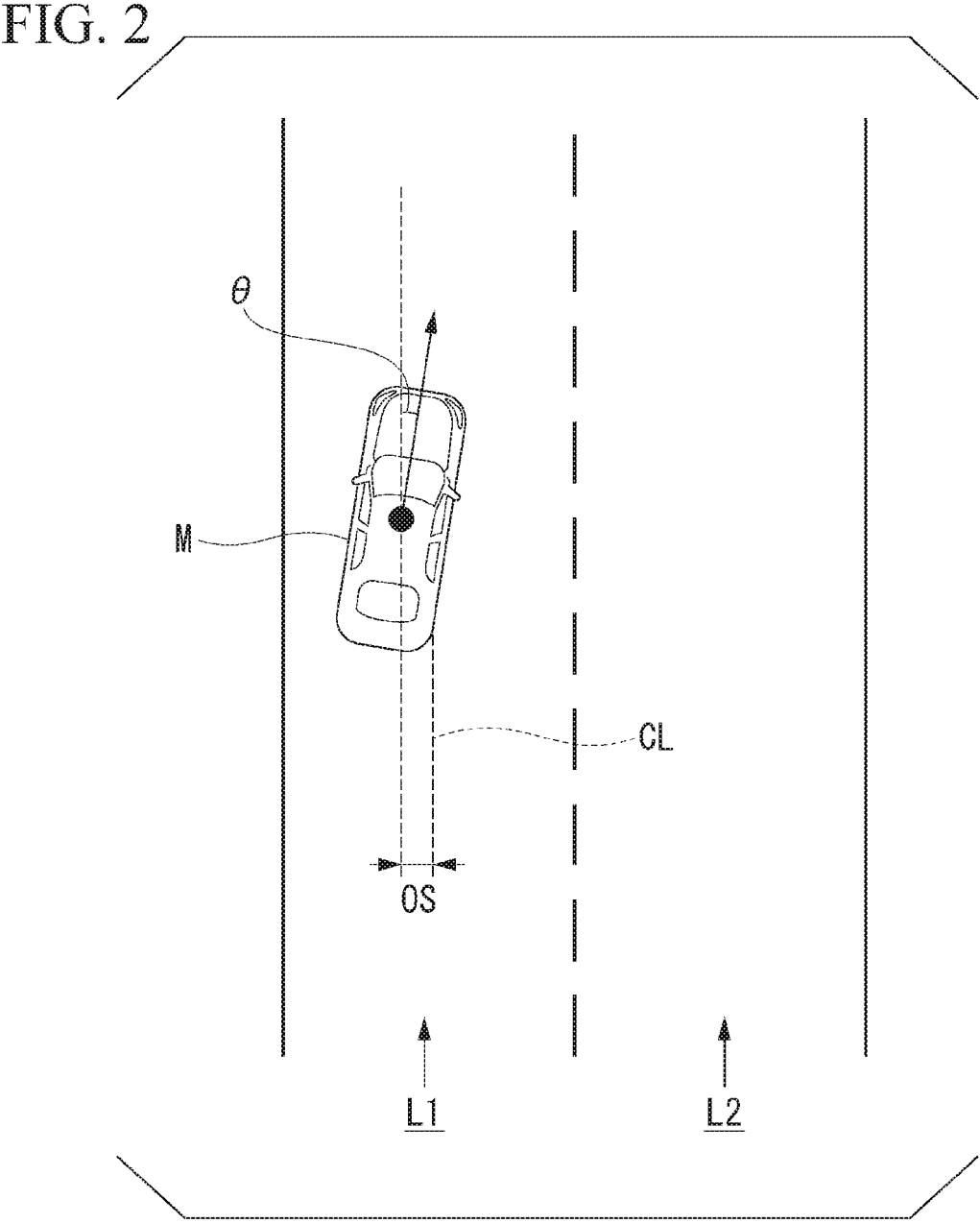
FIG. 2 is a diagram showing a view in which a relative position and a relative posture of a subject vehicle M with respect to a running lane L1 are recognized by a subject vehicle position recognizing unit 122.

Then, the subject vehicle position recognizing unit 122, for example, recognizes a position and a posture of the subject vehicle M with respect to the running lane. FIG. 2 is a diagram showing a view in which a relative position and a posture of a subject vehicle M with respect to a running lane L1 are recognized by the subject vehicle position recognizing unit 122. The subject vehicle position recognizing unit 122, for example, recognizes an offset OS of a reference point (for example, center of gravity) of the subject vehicle M from running lane center CL and an angle θ of an advancement direction of the subject vehicle M formed with respect to a line acquired by aligning the running lane center CL as a relative position and a posture of the subject vehicle M with respect to the running lane L1. In addition, instead of this, the subject vehicle position recognizing unit 122 may recognize a position of the reference point of the subject vehicle M with respect to any one side end of the running lane L1 or the like as a relative position of the subject vehicle M with respect to the running lane. The relative position of the subject vehicle M recognized by the subject vehicle position recognizing unit 122 is provided for the recommended lane determining unit 61 and the action plan generating unit 123.

The action plan generating unit 123 generates an action plan for the subject vehicle M to perform automated driving for a destination or the like. For example, the action plan generating unit 123 determines events to be sequentially executed in automated driving such that the subject vehicle M runs in a recommended lane determined by the recommended lane determining unit 61 and deals with to a surrounding status of the subject vehicle M. As the events, for example, there are a constant-speed running event in which the subject vehicle runs at a constant speed in the same running lane, a following running event in which the subject vehicle follows a vehicle running ahead, a lane changing event, a merging event, a branching event, an emergency stop event, a switching event for ending automated driving and switching to manual driving, and the like. In addition, at the time of starting such an event or during the execution of such an event, there are cases in which an action for avoidance is planned on the basis of surrounding statuses of the subject vehicle M (the presence/absence of surrounding vehicles and pedestrians, lane contraction according to road construction, and the like).

The action plan generating unit 123 generates a target locus in which the subject vehicle M will run in the future. A target locus is represented by sequentially aligning points (locus points) that the subject vehicle M is to reach. A locus point is a point that the subject vehicle M is to reach for every predetermined running distance, and additionally, a target speed and a target acceleration for every predetermined sampling time (for example, a fraction of a [sec]) are generated as a part of the target locus. In addition, a locus point may be a position that the subject vehicle M is to reach at a sampling time for every predetermined sampling time. In such a case, information of a target speed and a target acceleration are represented at the interval of locus points.

Figure 3:
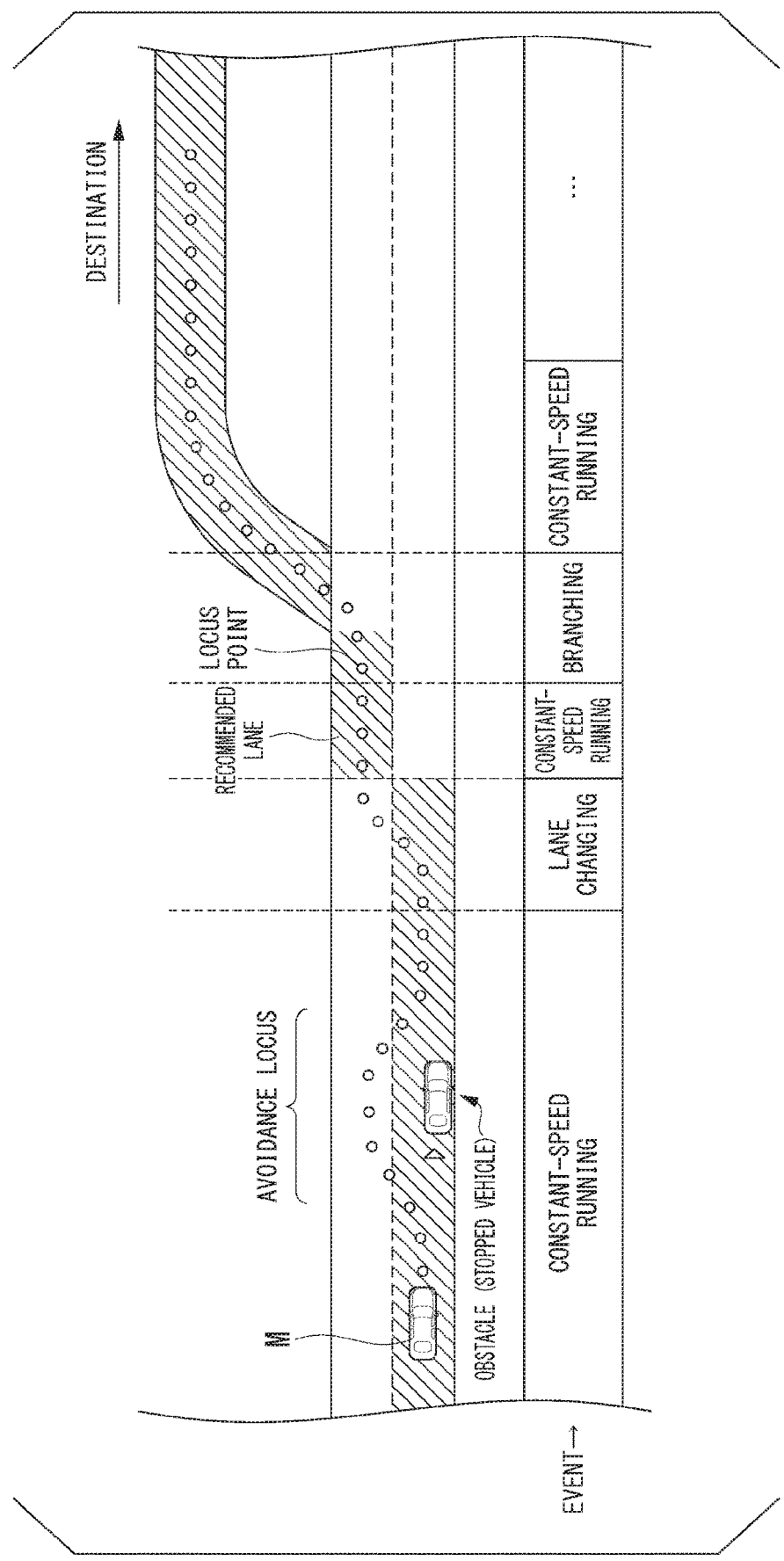
FIG. 3 is a diagram showing a view in which a target locus is generated on the basis of a recommended lane.

FIG. 3 is a diagram showing a view in which a target locus is generated on the basis of a recommended lane. As shown in the drawing, the recommended lane is set such that it is convenient for the subject vehicle to run along a route to a destination. When the subject vehicle reaches a point before a predetermined distance from a recommended lane switching place (may be determined in accordance with a type of event), the action plan generating unit 123 starts the lane changing event, the branching event, the merging event, or the like. In a case in which there is a need for avoiding an obstacle during the execution of each event, as shown in the drawing, an avoidance locus is generated.

The action plan generating unit or 123, for example, generates a plurality of candidates of a target locus and selects a target locus that is optimal for a route to a destination at that time point on the basis of the viewpoints of safety and efficiency.

In addition, the action plan generating unit 123, for example, includes an other-vehicle behavior predicting unit 123A. Details of the function of the other-vehicle behavior predicting unit 123A will be described later.

The second control unit 140, for example, includes a running control unit 141. The running control unit 141 controls the running driving force output device 200, the brake device 210, and the steering device 220 such that the subject vehicle M passes through a target locus generated by the action plan generating unit 123 at a scheduled time. In addition, the running control unit 141 may perform switching control between automated driving and manual driving of the subject vehicle M on the basis of an operation of a vehicle occupant that is accepted by the HMI 30.

The interface control unit 150 generates information that is output to the HMI 30. In addition, the interface control unit 150 acquired information that has been accepted by the HMI 30.

The information acquiring unit 160, for example, acquires running information 180A of other vehicles that ran in the past near a gate of a tollgate in a route to a destination accepted by the HMI 30 from an external device. In addition, in an embodiment, a gate, for example, may be not only a gate of a tollgate but also an entrance gate or an exit gate of a parking lot or may be a gate used for purchasing or receiving a product in a service such as drive-through.

The external device, for example, is a server apparatus (to be described later) connected to the subject vehicle M through a network. In addition, the external device may be other vehicle, which is present in the vicinity of the subject vehicle M, being capable of performing inter-vehicle communication. The running information 180A, for example, is information relating to running histories of other vehicle. More specifically, the running information 180A, for example, is information in which route information and information relating to a merging point based on statistics in a predetermined section after passing through a gate are associated with identification information of tollgates and the like that are a set of gates. The predetermined section, for example, is a section in which no partition line can be recognized by the partition line recognizing unit 121A. The information acquiring unit 160 stores the acquired running information 180A in the storage unit 180.

The running result providing unit 170 provides a running result based on the behavior of the subject vehicle M near a gate of a tollgate for the server apparatus using the communication device 20. The behavior of the subject vehicle M, for example, is route information within a section in which no partition line can be recognized by the partition line recognizing unit 121A after passaging through a gate. In addition, in the behavior of the subject vehicle M, position information or information relating to steering and acceleration/deceleration of the subject vehicle M that is consecutive within the section described above (for example, for every predetermined time) may be included.

The storage unit 180 is a storage device such as a hard disk drive (HDD), a flash memory, a random access memory (RAM), a read only memory (ROM), or the like. In the storage unit 180, for example, running information 180A is stored.

The running driving force output device 200 outputs a running driving force (torque) for allowing a vehicle to run to driving wheels. The running driving force output device 200, for example, includes a combination of an internal combustion engine, an electric motor, a transmission gear, and the like and an electronic control unit (ECU) controlling such components. The ECU controls the components described above on the basis of information input from the running control unit 141 or information input from the driving operator 80.

The brake device 210, for example, includes a brake caliper, a cylinder delivering hydraulic pressure to the brake caliper, an electric motor generating hydraulic pressure in the cylinder, and a brake ECU. The brake ECU controls the electric motor on the basis of the information input from the running control unit 141 or the information input from the driving operator 80 such that a brake torque corresponding to a braking operation is output to each vehicle wheel. The brake device 210 may include a mechanism that delivers a hydraulic pressure generated in accordance with an operation for a brake pedal included in the driving operator 80 to the cylinder through a master cylinder as a backup. In addition, the brake device 210 is not limited to the configuration described above and may be an electronic control-type hydraulic brake device that delivers a hydraulic pressure of the master cylinder to the cylinder by controlling an actuator on the basis of information input from the running control unit 141. In addition, the brake device 210 may include brake devices of a plurality of systems in consideration of the aspect of safety.

The steering device 220, for example, includes a steering ECU and an electric motor. The electric motor, for example, changes the direction of the steering wheel by applying a force to a rack and pinion mechanism. The steering ECU changes the direction of the steering wheel by driving the electric motor in accordance with information input from the running control unit 141 or information input from the driving operator 80.

Automated Driving Control of Subject Vehicle M in Case in Which no Partition Lines Can be Recognized Here, automated driving control of a subject vehicle M in a case in which no partition lines can be recognized on a road near a gate of a tollgate will be described. The subject vehicle M according to an embodiment, for example, in a section in which no partition lines can be recognized after passing through a gate, acquires running information of other vehicles which have ran through in the past from a server apparatus, determines a behavior of the subject vehicle M on the basis of the acquired running information, and executes automated driving on the basis of the determined behavior.

Figure 4:
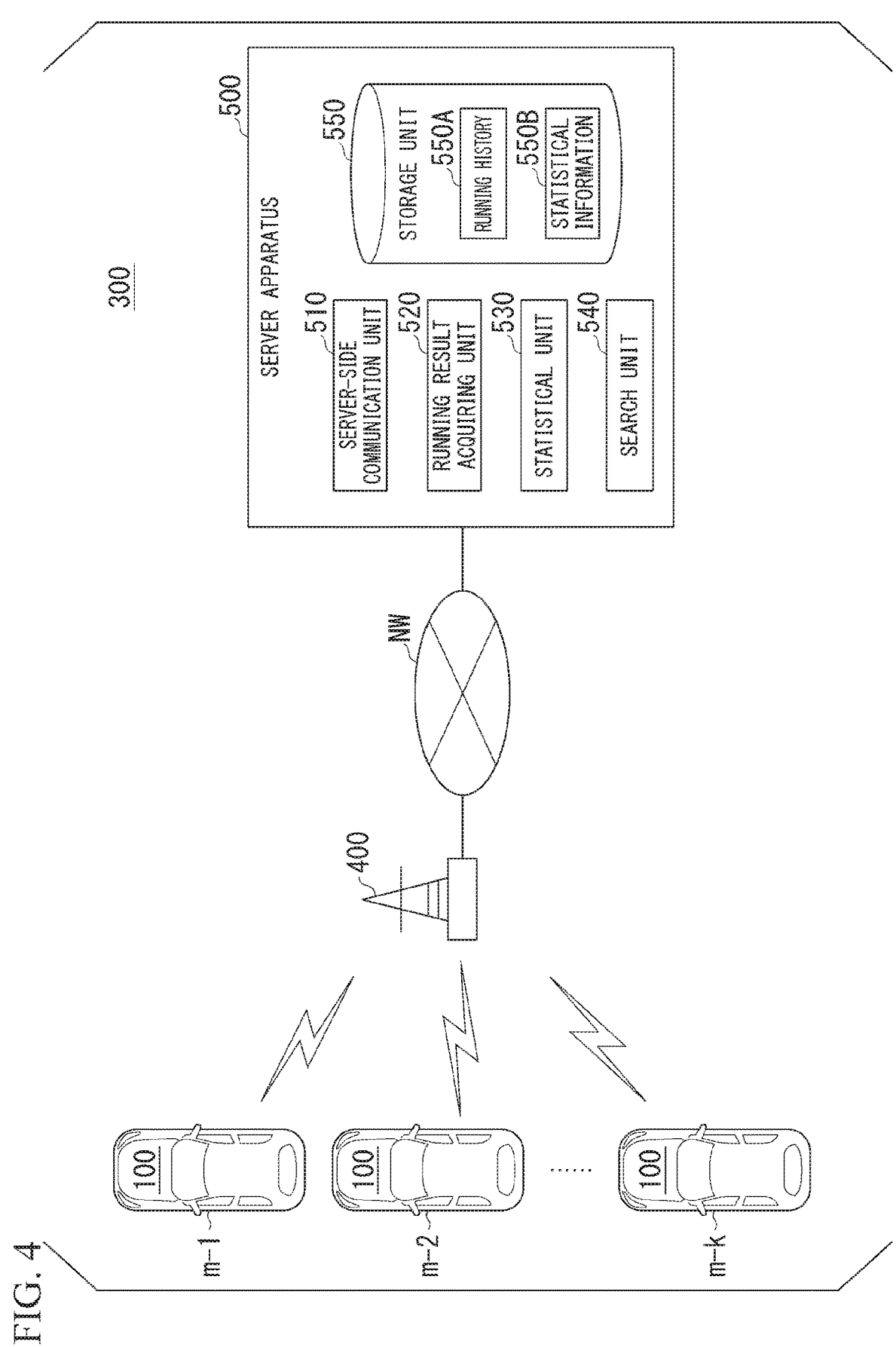
FIG. 4 is a diagram showing one example of the configuration of a traffic information sharing system 300.

Here, a traffic information sharing system including the automated driving control unit 100 according to an embodiment and a server apparatus will be described. FIG. 4 is a diagram showing one example of the configuration of a traffic information sharing system 300. The traffic information sharing system 300 includes a plurality of vehicles m-1 to m-k (here, k is an arbitrary natural number) in which automated driving control units 100 are mounted, a base station apparatus 400, and a server apparatus 500. For example, in each of the vehicles m-1 to m-k, components similar to those of the subject vehicle M described above are mounted. Hereinafter, in a case in which the vehicles m-1 to m-k are not to be differentiated from each other, one thereof will be simply referred to as a vehicle m. Regarding the vehicle m, the subject vehicle M is included.

Between the vehicle m and the base station apparatus 400, for example, radio communication using a mobile telephone network, a Wi-Fi network, or the like is performed. In addition, between the base station apparatus 400 and the server apparatus 500, communication through a network NW is performed. The network NW, for example, is a wide area network (WAN), a local area network (LAN), the Internet, or the like.

The vehicle m communicates with the server apparatus 500 through the base station apparatus 400. In addition, a plurality of vehicles m may directly perform inter-vehicle communication.

The server apparatus 500, for example, includes a server-side communication unit 510, a running result acquiring unit 520, a statistical unit 530, a search unit 540, and a storage unit 550. Each of the running result acquiring unit 520, the statistical unit 530, and the search unit 540 is realized by a processor such as a CPU executing a program. In addition, some or all of the functional units of the running result acquiring unit 520, the statistical unit 530, and the search unit 540 may be realized by hardware such as an LSI, an ASIC, an FPGA, or the like or may be realized by cooperation between software and hardware. The storage unit 550 is a storage device such as an HDD, a flash memory, a RAM, a ROM, or the like. Information of a running history 550A and statistical information 550B, for example, are stored in the storage unit 550.

The server-side communication unit 510 receives information of a running result transmitted by the vehicle m through the base station apparatus 400. The server-side communication unit 510 transmits the statistical information 550B stored by the server apparatus 500 to the vehicle m.

The running result acquiring unit 520, for example, acquires a running result received from the vehicle m using the server-side communication unit 510. The running result acquiring unit 520 stores the acquired running result in the storage unit 550 as a running history 550A in association with a tollgate ID, date and time information, and a vehicle ID.

FIG. 5 is a diagram showing one example of the running history 550A. The running history 550A, for example, is information in which date and time information, a vehicle ID, and a running result are associated with a tollgate ID. The tollgate ID is identification information of a tollgate. The date and time information is the date and time at which the vehicle m sent the running result. In the date and time information, information relating to a day may be included. The vehicle ID is identification information of the vehicle m.

The statistical unit 530 performs a statistical process for each tollgate ID of the running history 550A and identifies a representative route of the vehicle m after passing through the gate. The statistical unit 530, for example, may extract a running route, in which a lane in which a vehicle has ran immediately after passing through a gate and, thereafter, a lane after passing through a section in which no partition lines can be recognized are the same, from the running history 550A and acquire an average thereof, thereby acquiring route information based on statistics relating to the section in which no partition lines can be recognized.

In addition, the statistical unit 530 identifies a running route having the highest frequency among running routes in which a lane in which a vehicle has ran immediately after passing through a gate and, thereafter, a lane after passing through a section in which no partition line can be recognized are the same as a representative route of the vehicle m after passing through the gate.

In addition, the statistical unit 530 may perform a statistical process for every predetermined time frame or predetermined day on the basis of the date and time information of the running history 550A.

In addition, the statistical unit 530 recognizes or estimates information of a merging point of each route in each lane from route information based on statistics. In this case, the statistical unit 530, for example, recognizes a point at which the representative route of the vehicle m after passing through a gate and another representative route intersect with each other as a merging point. In addition, the statistical unit 530 may estimate a point at which routes of which frequencies or probabilities are equal to or higher than a predetermined value intersect with each other as a merging point on the basis of a running frequency, a running probability, or the like for a route of the vehicle m after passing through a gate. The statistical unit 530 stores route information and a merging point based on statistics in the storage unit 550 as the statistical information 550B in association with a tollgate ID.

FIG. 6 is a diagram showing one example of the statistical information 550B. In the example shown in FIG. 6, route information based on statistics and information of merging points are associated with a tollgate ID. In the route information based on statistics, route information corresponding to the number of lanes after passing through a gate and the number of combinations of lanes after passing through a section in which no partition line can be recognized after passing through the gate is set. In addition, a merging point, for example, is represented using coordinates of latitude and longitude. Furthermore, a merging point may be represented in a coordinate system having an area within a section in which no partition line can be recognized as a reference.

The search unit 540 extracts route information and information of merging points based on corresponding statistics by referring to the statistical information 550B on the basis of a search condition supplied from the vehicle m. The search condition, for example, is a tollgate ID. The search unit 540 transmits the route information and the information of merging points based on retrieved statistics to the vehicle M as the running information 180A.

Determination of Behavior of Subject Vehicle

Next, behavior of the subject vehicle M in a section in which no partition line can be recognized after passing through a gate is determined will be described. In an embodiment, the information acquiring unit 160 acquires the running information 180A at a time point before passage of a section in which no partition line can be recognized.

Figure 7:
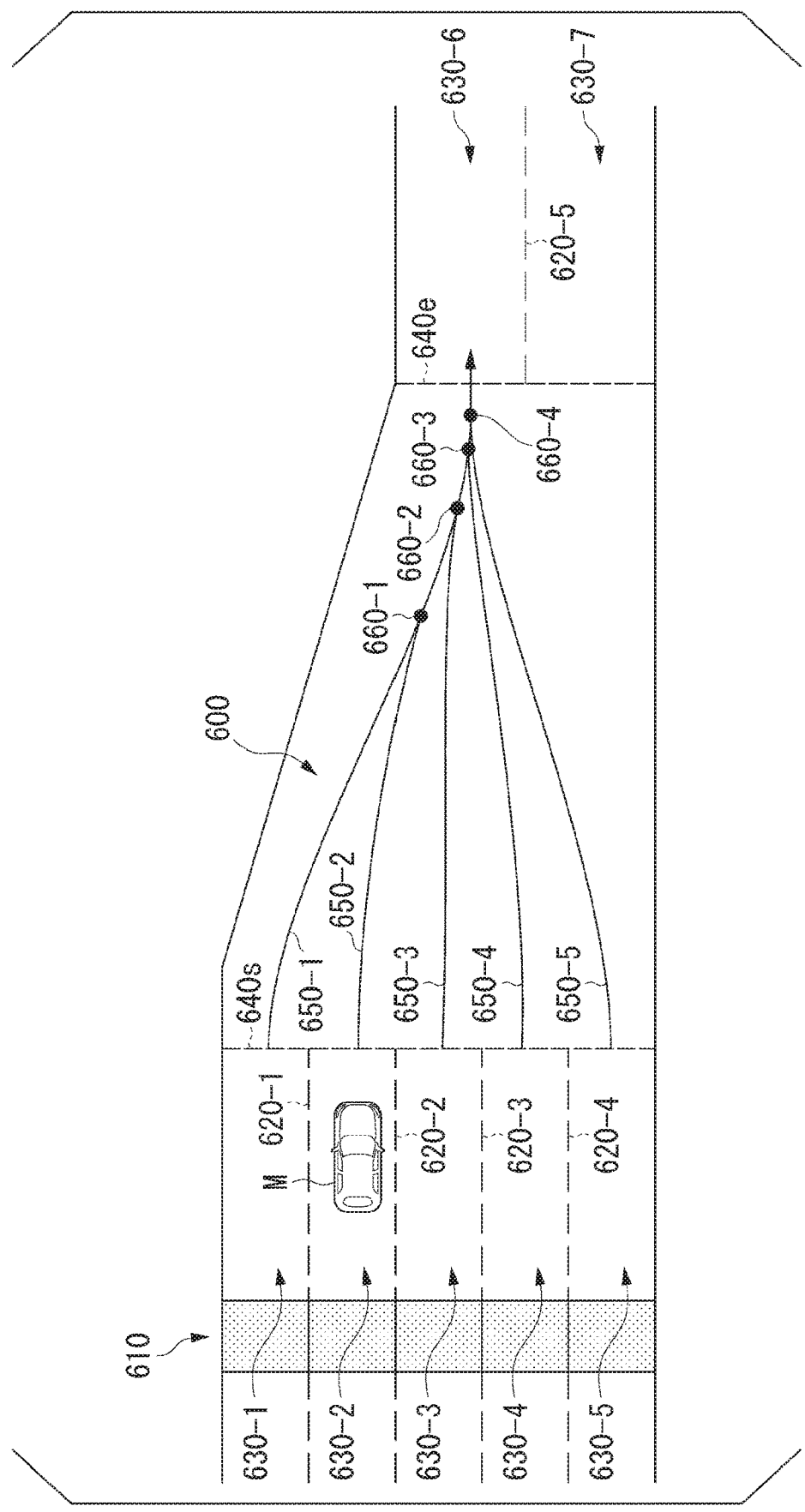
FIG. 7 is a diagram showing a running route of other vehicle in a section in which no partition line is recognizable.

FIG. 7 is a diagram showing a running route of another vehicle in a section in which no partition line can be recognized. In the example shown in FIG. 7, a state after passing through a gate 610 of a tollgate installed on a road 600 on which the subject vehicle M is running is shown. In the example shown in FIG. 7, partition lines are drawn in correspondence with 5 gates on the entrance side.

The partition line recognizing unit 121A, for example, recognizes partition lines present in the vicinity of the subject vehicle M, for example, from shapes of parts at which edge points are continuous in an image and the like on the basis of information input from the camera 10, the radar device 12, and the finder 14 through the object recognizing device 16. In the example shown in FIG. 7, the partition line recognizing unit 121A recognizes partition lines 620-1 to 620-5 present in the vicinity of the subject vehicle M. On the gate 610 side, by partitioning the road 600 using the partition lines 620-1 to 620-4, lanes 630-1 to 630-5 are formed. In addition, in a section in which no partition line can be recognized, by partitioning the road 600 using the partitioning line 620-5, lanes 630-6 and 630-7 are formed.

In addition, the partition line recognizing unit 121A recognizes a section in which no partition line can be recognized. In the example shown in FIG. 7, a section of a dotted line 640s to a dotted line 640e is a section in which no partition line can be recognized by the partition line recognizing unit 121A.

The action plan generating unit 123 acquires information relating to running routes 650-1 to 650-5 corresponding to a tollgate ID in the section of the dotted line 640s to the dotted line 640e by referring to the running information 180A stored in the storage unit 180. In addition, in the example shown in FIG. 7, a running route is shown in a case in which a vehicle runs in the lane 630-6 out of the runnable lanes 630-6 and 630-7 after passing through a section in which no partition line can be recognized. In addition, in the example shown in FIG. 7, merging points 660-1 to 660-4 corresponding to the running routes 650-1 to 650-5 are shown in the running route.

Here, in a case in which the subject vehicle M is planning to run in the lane 630-6, the action plan generating unit 123 determines a running route 650-2 corresponding to the lane 630-2 in which the subject vehicle M is currently running as a running route along which the subject vehicle M is to run. Then, the action plan generating unit 123 generates a target locus on the basis of the determined running route 650-2 and executes automated driving on the basis of the generated target locus.

In this way, in the case of running in a section in which no partition line can be recognized, the subject vehicle M can run on the basis of running routes of other vehicles that ran in the section in the past. In addition, since the subject vehicle M can run along a route that is acquired statistically, smooth running can be realized in a section in which no partition line can be recognized.

Consideration of Behavior of Other Vehicles

Figure 8:
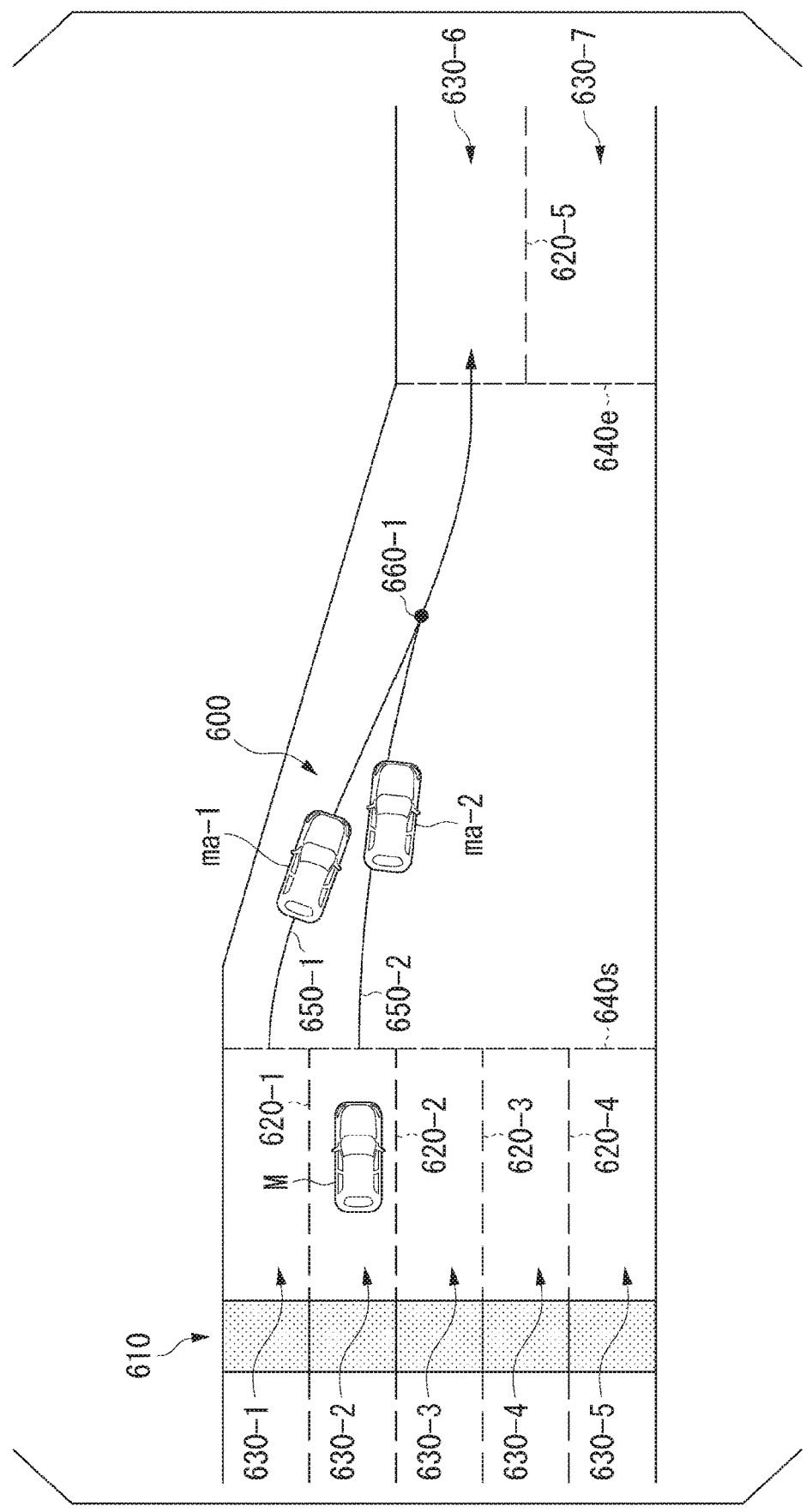
FIG. 8 is a diagram showing a view in which behaviors of surrounding vehicles are predicted by an other-vehicle behavior predicting unit 123A.

In a case in which the subject vehicle M is running in a section in which no partition line can be recognized and a case in which there is a surrounding vehicle in the vicinity of the subject vehicle M, the other-vehicle behavior predicting unit 123A predicts a behavior of the surrounding vehicle. FIG. 8 is a diagram showing prediction of the behavior of a surrounding vehicle by the other-vehicle behavior predicting unit 123A.

The other-vehicle behavior predicting unit 123A acquires information relating to a virtual merging point 660-1 of surrounding vehicles ma-1 and ma-2 recognized or estimated from the running information 180A for the surrounding vehicles ma-1 and ma-2 recognized by the external system recognizing unit 121. Then, the other-vehicle behavior predicting unit 123A predicts the behaviors of surrounding vehicles running along virtual loci merging into the target locus of the subject vehicle M.

In the example shown in FIG. 8, the surrounding vehicle ma-1 enters a section that cannot be recognized from the lane 630-1 and is running along a locus corresponding to the running route 650-1 of the running information 180A. For this reason, the other-vehicle behavior predicting unit 123A predicts that the surrounding vehicle ma-1 will run along the running route 650-1 thereafter from the behavior of the surrounding vehicle ma-1 described above. In addition, the surrounding vehicle ma-2 enters a section in which no partition line can be recognized from the lane 630-2 and is running along the running route 650-2 of the running information 180A. For this reason, the other-vehicle behavior predicting unit 123A predicts that the surrounding vehicle ma-2 will run along the running route 650-2 thereafter from the behavior of the surrounding vehicle ma-2 described above.

In addition, the other-vehicle behavior predicting unit 123A may predict the running of the surrounding vehicles ma-1 and ma-2 on the basis of real-time communication information (for example, traffic information of a road and steering information and acceleration/deceleration information of surrounding vehicles) acquired from the server apparatus 500 and at least one of the surrounding vehicles ma-1 and ma-2 through the communication device 20. In addition, the other-vehicle behavior predicting unit 123A may predict running of the surrounding vehicles ma-1 and ma-2 by combining the behaviors of the surrounding vehicles ma-1 and ma-2 described above, the communication information described above, and the like. Furthermore, the other-vehicle behavior predicting unit 123A may predict whether or not a surrounding vehicle has cut in on a side in front of the subject vehicle M on the basis of the behavior of the surrounding vehicle and the communication information.

The action plan generating unit 123 sets a surrounding vehicle that will likely run immediately before (within a predetermined distance from) the subject vehicle M at a merging point as a target on the basis of the behavior of the surrounding vehicle ma-1 or ma-2 in the future that is predicted by the other-vehicle behavior predicting unit 123A and performs following running for the surrounding vehicle ma-1 or ma-2.

Figure 9:
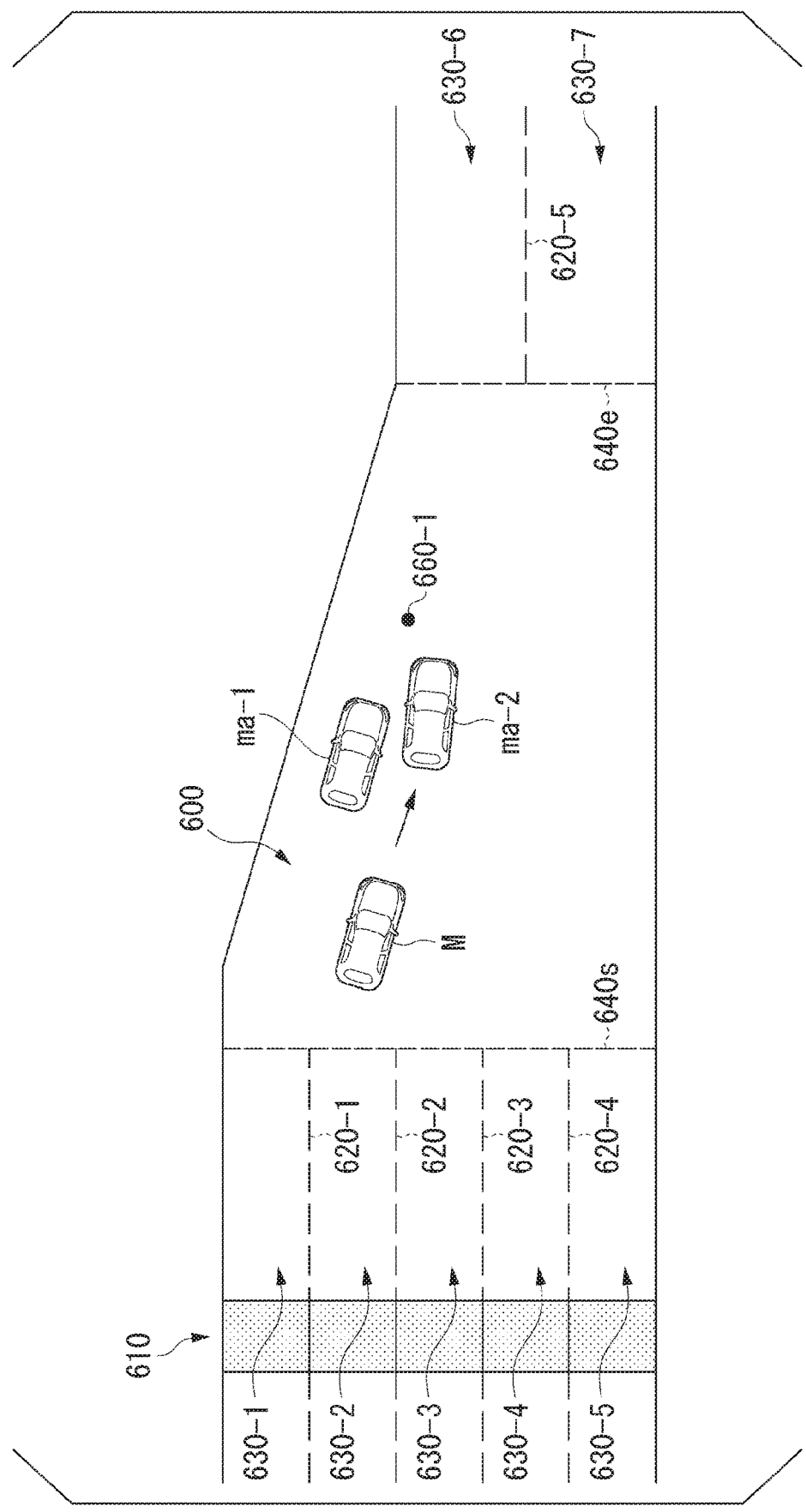
FIG. 9 is a diagram showing a view in which following running for a surrounding vehicle is performed.

FIG. 9 is a diagram showing a state in which following running for a surrounding vehicle is performed. The action plan generating unit 123 determines a behavior of the subject vehicle M such that following running is performed with a surrounding vehicle ma-2 running in the same lane as that of the subject vehicle M as a target vehicle. In this way, the subject vehicle M can run by forming a vehicle sequence in a section in which no partition line can be recognized, and the flow of vehicles is generated in accordance with the vehicle sequence, whereby smooth running can be realized.

In addition, the action plan generating unit 123 performs control of maintaining a predetermined inter-vehicle distance from the surrounding vehicle ma-2 at a virtual merging point 660-1 in the following running for the surrounding vehicle ma-2. In addition, in a case in which it is predicted by the other-vehicle behavior predicting unit 123A that the surrounding vehicle ma-1 recognized by the external system recognizing unit 121 will cut in on a side in front of the subject vehicle M, the action plan generating unit 123 may perform control of maintaining a predetermined inter-vehicle distance from the surrounding vehicle ma-2 running on a side in front of the subject vehicle M. Here, the predetermined inter-vehicle distance described above, for example, is a distance at which at least one vehicle can enter therebetween. In this way, congestion and delay at the virtual merging point 660-1 or in cutting-in of a surrounding vehicle are inhibited, and smooth running can be realized. In addition, in a case in which a surrounding vehicle ma-1 enters between the subject vehicle M and a surrounding vehicle ma-2, the action plan generating unit 123 may execute following running for the surrounding vehicle ma-1.

Figure 10:
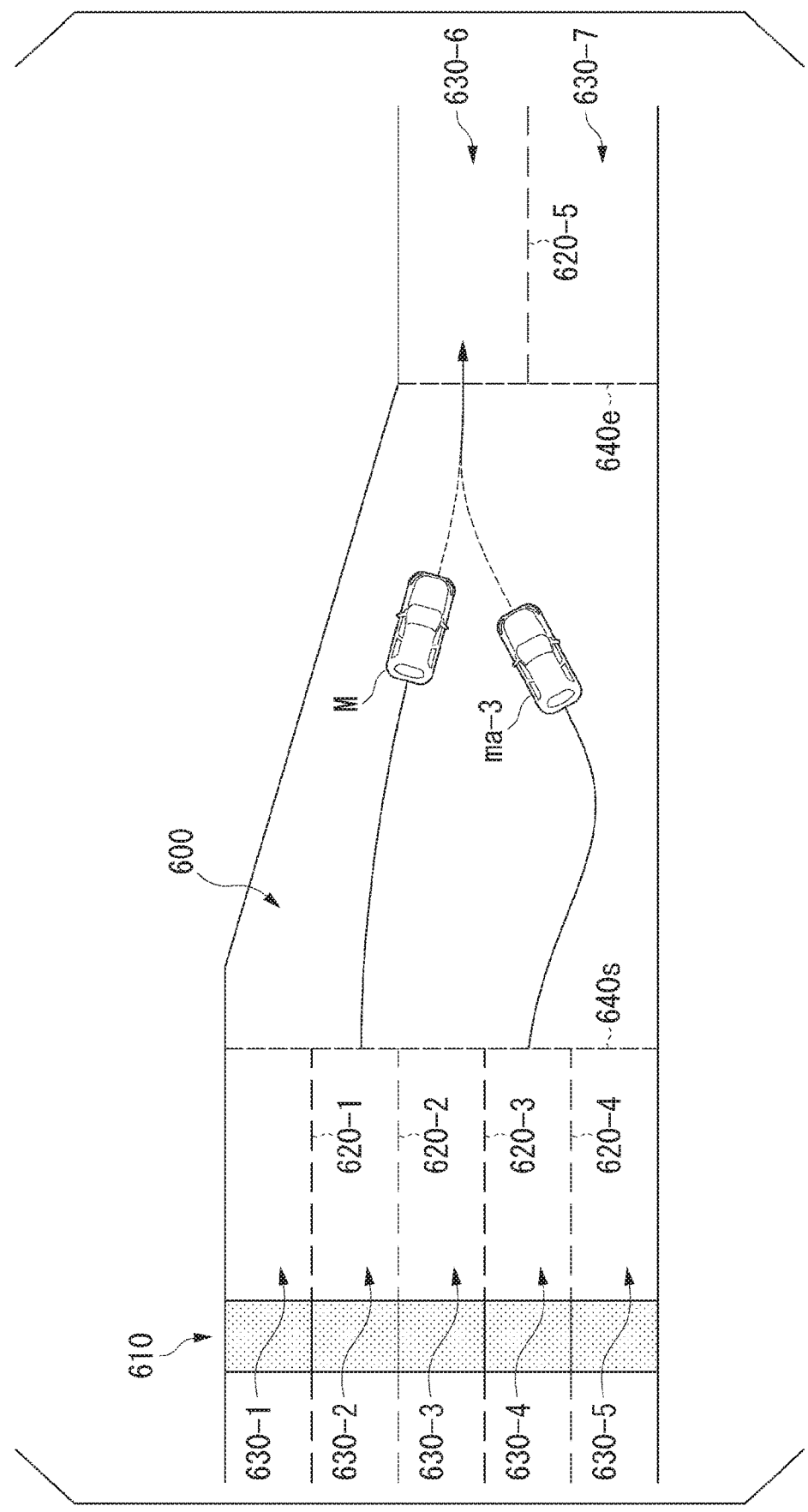
FIG. 10 is a diagram showing a view in which a collision determination is performed.

In addition, in a case in which it is determined that a surrounding vehicle is approaching on the basis of the behavior of the surrounding vehicle, the action plan generating unit 123 may perform control of avoiding a collision with the surrounding vehicle. FIG. 10 is a diagram showing a state of the behavior of a surrounding vehicle. The other-vehicle behavior predicting unit 123A determines whether or not a surrounding vehicle is approaching the subject vehicle M on the basis of a running route of the surrounding vehicle and a velocity vector thereof with respect to the subject vehicle M.

In the example shown in FIG. 10, in a case in which the running route of the surrounding vehicle ma-3 approaches to within a predetermined distance from the running route of the subject vehicle M, and a relative velocity vector with respect to the subject vehicle M is directed in the direction of the subject vehicle M, the other-vehicle behavior predicting unit 123A determines that the surrounding vehicle ma-3 is approaching the subject vehicle M. Then, the action plan generating unit 123 performs control of acceleration/deceleration or steering of the subject vehicle M and executes automated driving of avoiding a collision with the surrounding vehicle ma-3. In this case, the other-vehicle behavior predicting unit 123A, for example, may perform determination of approach to the subject vehicle M by additionally taking a condition of a case in which the amount of change in the horizontal position of the surrounding vehicle ma-3 exceeds a threshold or the like into account. In this way, by performing determination of approach of a surrounding vehicle, the subject vehicle M can improve safety near an exit of a tollgate at which there is a high likelihood of merging.

In addition, in a case in which a section in which no partition line can be recognized near an exit of a tollgate is congested, the action plan generating unit 123 may perform following running for following a vehicle running ahead without using the running information 180A. In addition, in a case in which there are no surrounding vehicles in a section in which no partition line can be recognized near an exit of a tollgate or in a case in which a surrounding vehicle within a section is a predetermined distance or more away from the subject vehicle M, the action plan generating unit 123 may generate a target locus up to a lane 630-6 toward the destination without using the running information 180A and execute automated driving on the basis of the generated target locus.

Process Flow

Figure 11:
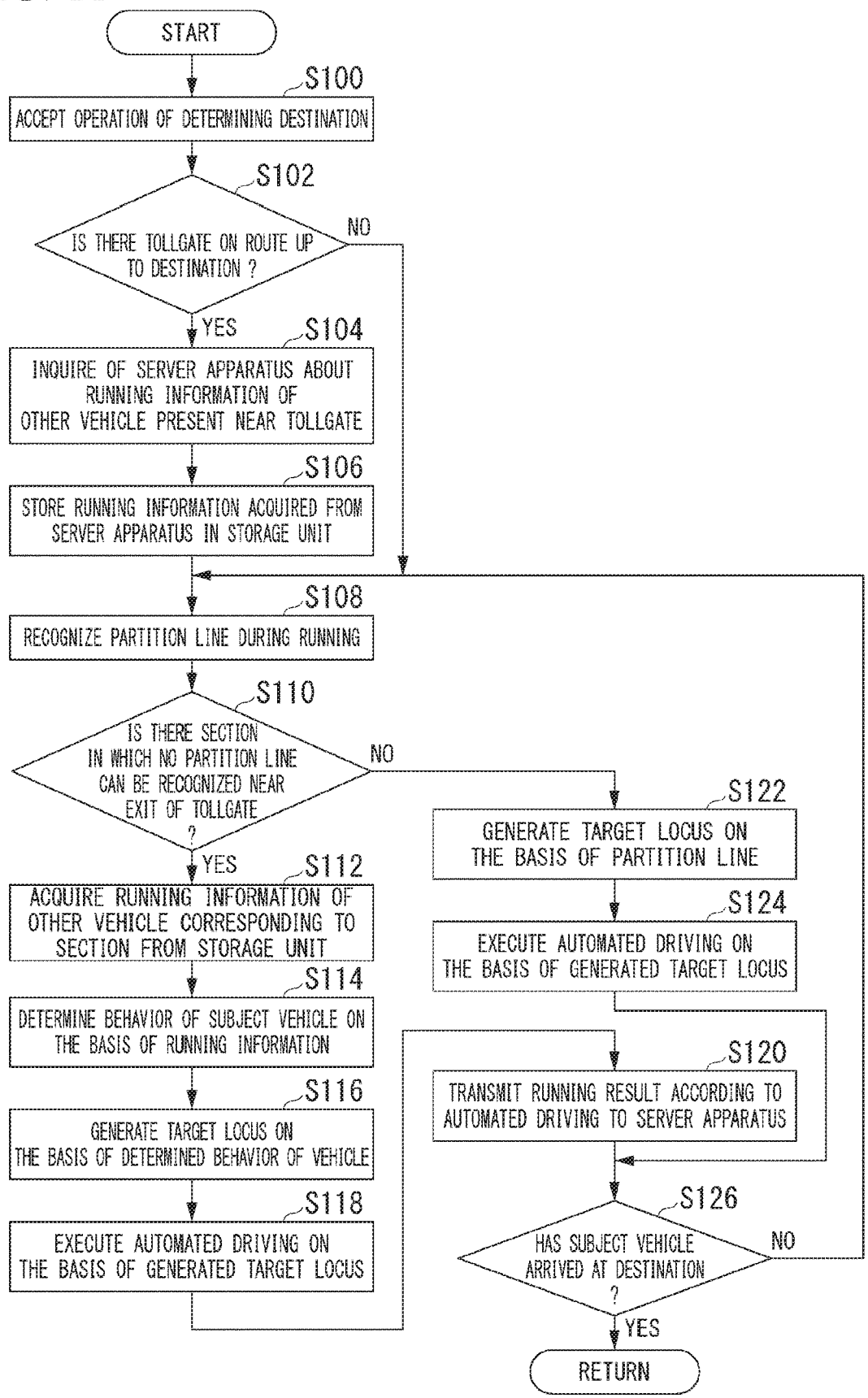
FIG. 11 is a flowchart showing one example of automated driving control according to an embodiment.

Hereinafter, one example various kinds of vehicle control using the vehicle system 1 according to an embodiment will be described. FIG. 11 is a flowchart showing one example of automated driving control according to an embodiment.

First, the interface control unit 150 accepts an operation of determining a destination using the HMI 30 (Step S100). Next, the information acquiring unit 160 determines whether or not there is a tollgate on the route to the destination (Step S102). In a case in which there is a tollgate, the information acquiring unit 160 inquires of the server apparatus 500 about running information of other vehicles positioned near the tollgate (Step S104) and stores the running information acquired through the inquiry in the storage unit 180 (Step S106).

After the process of Step S106 or in a case in which there is no tollgate in the process of Step S102, the partition line recognizing unit 121A recognizes partition lines during running (Step S108) and determines whether or not there is a section in which no partition line can be recognized near an exit of a tollgate (Step S110). In a case in which there is a section in which no partition line can be recognized, the action plan generating unit 123 acquires running information of other vehicles corresponding to the section from the storage unit 180 (Step S112). Next, the action plan generating unit 123 determines a behavior of the subject vehicle M on the basis of the acquired running information (Step S114).

Next, the action plan generating unit 123 generates a target locus on the basis of the determined behavior of the subject vehicle M (Step S116) and executes automated driving on the basis of the generated target locus (Step S118). Next, the running result providing unit 170 transmits a running result according to the automated driving to the server apparatus 500 (Step S120).

In addition, in a case in which there is no section in which no partition line can be recognized near an exit of a tollgate in the process of Step S110, the action plan generating unit 123 generates a target locus on the basis of partition lines (Step S122) and executes automated driving on the basis of the generated target locus (Step S124).

After the process of Step S120 or Step S124, the subject vehicle position recognizing unit 122 determines whether or not the subject vehicle M has arrived at the destination (Step S126). In a case in which the subject vehicle has not arrived at the destination, the process is returned to the process of S108. On the other hand, in a case in which the subject vehicle M has arrived at the destination, the process of this flowchart ends.

In addition, in the example shown in FIG. 11, although the server apparatus 500 is inquired of about running information of other vehicles positioned near a tollgate that is present up to a destination at a timing at which an operation of determining a destination is accepted, the information acquiring unit 160 may inquire of the server apparatus 500 about running information at a timing at which a distance to a tollgate is within a threshold.

Modified Example

[Acquisition of Running Information Using Inter-Vehicle Communication]

In the embodiment described above, although the information acquiring unit 160 has been described to acquire running information based on statistics from the server apparatus 500, the acquisition of running information is not limited thereto. Thus, running information 180A may be acquired from a surrounding vehicle through inter-vehicle communication, and automated driving may be executed on the basis of the acquired running information 180A.

Figure 12:
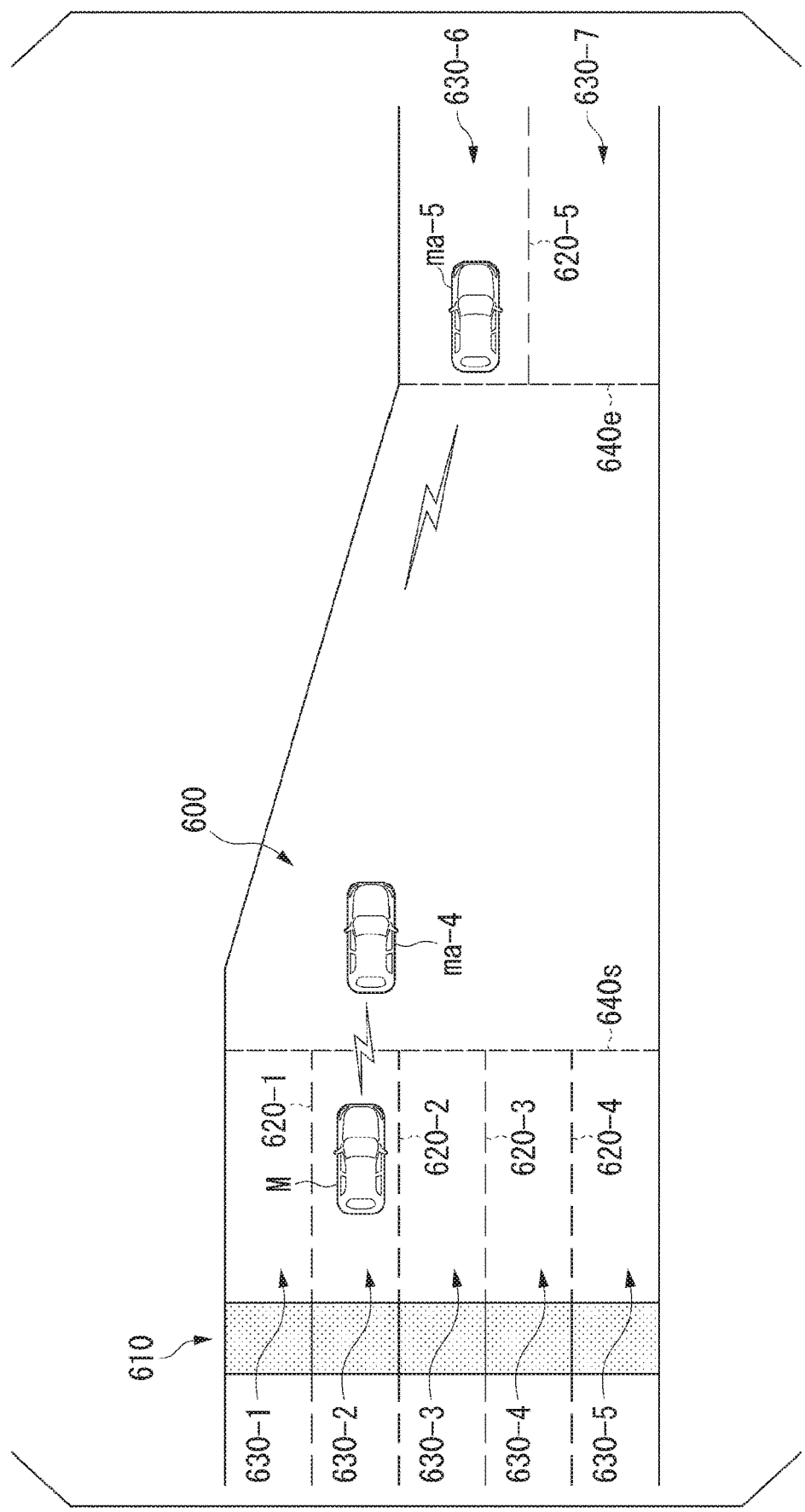
FIG. 12 is a diagram showing a view in which running information is acquired through inter-vehicle communication.

FIG. 12 is a diagram showing a view in which running information is acquired through inter-vehicle communication. In an example shown in FIG. 12, it is assumed that a subject vehicle M can communicate with surrounding vehicles ma-4 and ma-5. The information acquiring unit 160 requests the surrounding vehicles ma-4 and ma-5 to acquire running information 180A. In addition, the information acquiring unit 160 acquires running information 180A transmitted from the surrounding vehicles ma-4 and ma-5. The action plan generating unit 123 determines a behavior of the subject vehicle M on the basis of the received running information 180A and executes automated driving on the basis of the determined behavior.

In addition, in a case in which running information 180A is acquired from the surrounding vehicle ma-5 that has passed through a section in which no partition line can be recognized, the information acquiring unit 160 may acquire a result of running when the surrounding vehicle ma-5 actually runs. In this case, the action plan generating unit 123 generates a target locus of the subject vehicle M on the basis of the acquired result of running and executes automated driving on the basis of the generated target locus.

In this way, the action plan generating unit 123 can cause the subject vehicle M to run along an appropriate running route corresponding to situations at the current time point on the basis of the result of running of the surrounding vehicle ma-5 that has run immediately before the section in which no partition line can be recognized.

In addition, the information acquiring unit 160 may have a function similar to that of the statistical unit 530 of the server apparatus 500. In such a case, the information acquiring unit 160 acquires results of running of a plurality of surrounding vehicles through inter-vehicle communication and performs a statistical process for the acquired results of running, thereby acquiring running information 180A.

Figure 13:
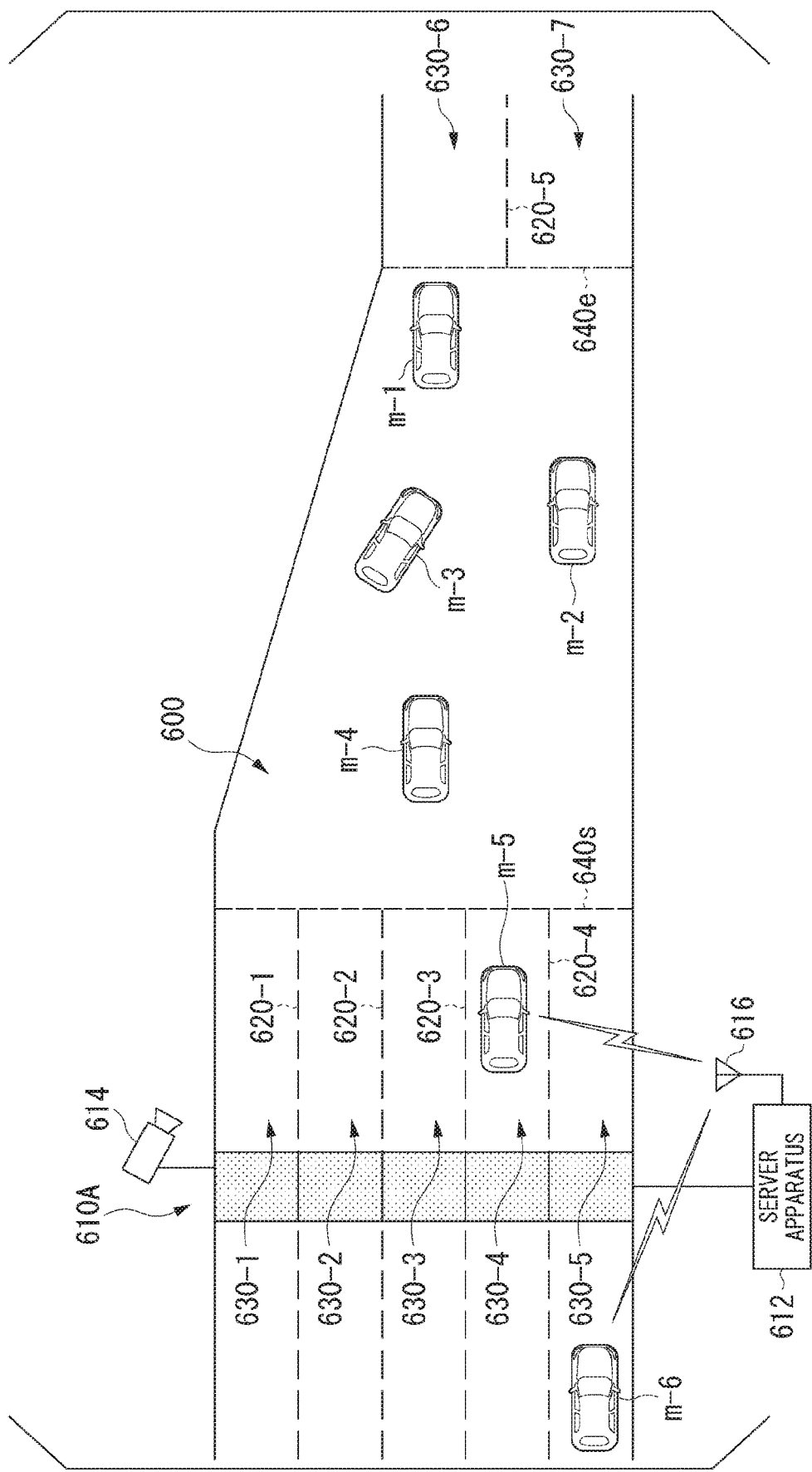
FIG. 13 is a diagram showing a view in which a server apparatus 612 is mounted at a gate 610A.

In addition, in an embodiment, each functional unit corresponding to the server apparatus 500 may be mounted at the gate 610. FIG. 13 is a diagram showing a view in which the server apparatus 612 is mounted at the gate 610A. The functional configuration of the server apparatus 612 has a function similar to the server apparatus 500 described above, and thus detailed description thereof will be omitted here.

In the example shown in FIG. 13, the server apparatus 612 acquires videos of vehicles m-1 to m-4 running in a section in which no partition line can be recognized immediately after the gate 610A imaged by a camera (imaging unit) 614 disposed at the gate 610A. In addition, the server apparatus 612 acquires running histories by tracking behaviors of the vehicles m-1 to m-4 on the basis of the acquired videos and performs a statistical process on the basis of the acquired running histories of the vehicles m-1 to m-4.

In addition, the server apparatus 612 transmits running information of other vehicles based on the statistical information to vehicles present near the gate 610A such as the vehicle m-5 immediately after passing through of the gate 610A, the vehicle m-6 immediately before passage of the gate 610A, and the like, for example, through an antenna 616 included in the server apparatus 612 using a communication system such as a dedicated short range communications (DSRC) or the like.

In this way, a vehicle m does not transmit running results to the server apparatus 612, and accordingly, the processing load can be reduced. In addition, the server apparatus 612 directly communicates with vehicles present near the gate 610A, for which there are requests for acquisition of running information 180A, without using a network NW, the base station apparatus 400, and the like, and accordingly, delay in communication can be prevented. In addition, only running information relating to one gate 610A may be transmitted, and accordingly, the amount of communication can be reduced.

According to the vehicle control system, the vehicle control method, and the vehicle control program of the embodiment described above, the execution continuity of automated driving in a section in which no partition line can be improved in a section in which no partition line can be recognized immediately after a gate. In addition, according to the embodiment, behaviors of surrounding vehicles and a merging point are predicted on the basis of running histories of other vehicles, and a behavior of the subject vehicle M is determined on the basis of a result of the prediction, and accordingly, the subject vehicle can run along an appropriate route. Furthermore, according to the embodiment, congestion and delay are inhibited near an exit of a gate having a high likelihood of merging, and smooth running can be realized.

As above, although a form of the present invention has been described using an embodiment, the present invention is not limited to such an embodiment at all, and various modifications and substitutions can be applied within a range not departing from the concept of the present invention.

REFERENCE SIGNS LIST 1 vehicle system
10, 614 camera
12 radar device
14 finder
16 object recognizing device
20 communication device
30 HMI
50 navigation device
60 MPU
70 vehicle sensor
80 driving operator
90 vehicle indoor camera
100 automated driving control unit
120 first control unit
121 external system recognizing unit
121A partition line recognizing unit
122 subject vehicle position recognizing unit
123 action plan generating unit
123A other-vehicle behavior predicting unit
140 second control unit
141 running control unit
150 interface control unit
160 information acquiring unit
170 running result providing unit
180, 550 storage unit
200 running driving force output device
210 brake device
220 steering device
300 traffic information sharing system
400 base station apparatus
500, 612 server apparatus
510 server-side communication unit
520 running result acquiring unit
530 statistical unit
540 search unit
610, 610A gate
616 antenna
M subject vehicle

What is claim is:

1. A vehicle control system comprising:
a memory storing instructions; and
a processor configured to execute the instructions stored in the memory to:
recognize partition lines of a road on which a subject vehicle is running;
acquire information relating to running histories of other vehicles for a section in which no partition line can be recognized from an external device;
recognize positions of other vehicles running in a vicinity of the subject vehicle;
predict behaviors of the other vehicles based on the information relating to the running histories of the other vehicles; and
determine a behavior of the subject vehicle and perform automated driving based on the behaviors of the other vehicles in a case in which there is a section in which no partition line can be recognized after passing through a gate installed on the road.

2. The vehicle control system according to claim 1, wherein the processor predicts behaviors of other vehicles running along virtual loci merging into a target locus of the subject vehicle based on information relating to virtual merging points of the other vehicles that are recognized or estimated based on the running histories of the other vehicles.

3. The vehicle control system according to claim 1, wherein the processor performs following running for the other vehicles running along the virtual loci merging into the target locus of the subject vehicle.

4. The vehicle control system according to claim 1, wherein the processor performs determination of approach for the other vehicles running along virtual loci merging into the target locus of the subject vehicle and executes automated driving of avoiding a collision with the other vehicles based on a result of the determination of approach.

5. The vehicle control system according to claim 1, wherein the processor performs control of maintaining a predetermined inter-vehicle distance from other vehicle running in front of the subject vehicle in a case in which it is estimated that other vehicle recognized has cut in front of the subject vehicle.

6. A vehicle control system comprising:

a memory storing instructions; and a processor configured to execute the instructions stored in the memory to:

recognize partition lines of a road in which a subject vehicle is running;

acquire information relating to running histories of other vehicles for a section in which no partition line can be recognized from an external device; and determine a behavior of the subject vehicle and perform automated driving based on the running histories in a case in which there is a section in which no partition line can be recognized after passing through a gate installed on the road, wherein the processor performs control of maintaining a predetermined inter-vehicle distance from other vehicles running in front of the subject vehicle at a virtual merging point of the other vehicles recognized or estimated based on the running histories of the other vehicles.

7. The vehicle control system according to claim 6, wherein the predetermined inter-vehicle distance is a distance allowing entrance of at least one vehicle.

8. A vehicle control method using an in-vehicle computer, the vehicle control method comprising:

recognizing partition lines of a road on which a subject vehicle is running;

acquiring information relating to running histories of other vehicles for a section in which no partition line can be recognized from an external device;

recognizing positions of other vehicles running in a vicinity of the subject vehicle;

predicting behaviors of the other vehicles based on the information relating to the running histories of the other vehicles; and determining a behavior of the subject vehicle and performing automated driving based on the behaviors of the other vehicles in a case in which there is a section in which no partition line can be recognized after passing a gate installed on the road.

* * * * *

UNITED STATES PATENT AND TRADEMARK OFFICE
CERTIFICATE OF CORRECTION

PATENT NO. : 11,161,512 B2  
APPLICATION NO. : 16/471611  
DATED : November 2, 2021  
INVENTOR(S) : Takeda et al.

Page 1 of 1

It is certified that error appears in the above-identified patent and that said Letters Patent is hereby corrected as shown below:

On the Title Page

Item (54) and in the Specification, in Column 1, Lines 1-3 TITLE should read:  
VEHICLE CONTROL SYSTEM, AND VEHICLE CONTROL METHOD Signed and Sealed this  
Twenty-second Day of February, 2022

Drew Hirshfeld  
*Performing the Functions and Duties of the*  
*Under Secretary of Commerce for Intellectual Property and*  
*Director of the United States Patent and Trademark Office*